United States Patent [19]
Barboni
[11] 3,774,160
[45] Nov. 20, 1973

[54] DIGITAL FRAME COUNTER

[75] Inventor: Philip G. Barboni, Binghamton, N.Y.
[73] Assignee: The Singer Company, Binghamton, N.Y.

[22] Filed: Feb. 15, 1972
[21] Appl. No.: 226,434

[52] U.S. Cl. .............................. 340/172.5, 352/160
[51] Int. Cl. .............................. G03b 21/46
[58] Field of Search .................. 340/347 CC, 172.5; 235/92 PL; 352/160

[56] References Cited
UNITED STATES PATENTS 3,541,446 9/1968 Prozeller ...................... 340/347 CC
3,555,418 1/1971 Fluegel ...................... 340/347 CC
3,533,098 10/1970 Munoz ...................... 340/347 CC
3,585,376 6/1971 Toscano ...................... 235/92 PL
3,571,575 3/1971 Barr et al. ...................... 235/92 PL

*Primary Examiner*—Paul J. Henon
*Assistant Examiner*—Mark Edward Nusbaum
*Attorney*—Francis L. Masselle

[57] ABSTRACT

A frame counter for use in a projector having a high speed pulldown is shown in which a bit on a shaft encoder is used to indicate proper framing. Movement from one frame to another will cause a pulse output from the encoder which is processed through delay circuits to filter out noise and to provide a count pulse. The count pulse is Anded with a forward-reverse signal, provided by a circuit which insures a change in count direction only when the film has actually reversed direction, to provide an input to an up down counter wherein the cumulative count is stored.

11 Claims, 1 Drawing Figure

PATENTED NOV 20 1973 3,774,160
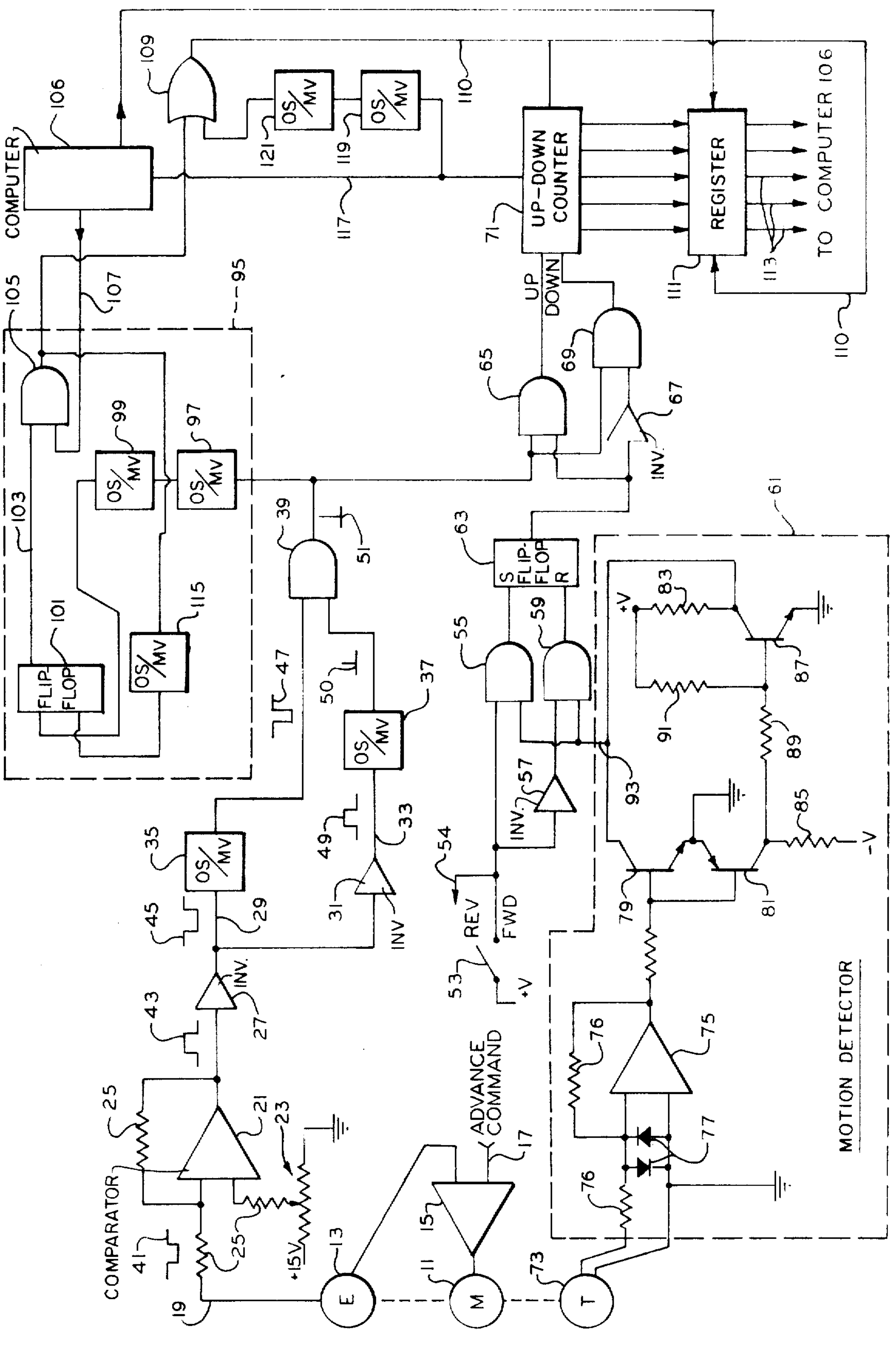

DIGITAL FRAME COUNTER

The Invention herein described was made in the course of or under a contract, or subcontract thereunder, with the Department of the Navy.

This invention relates to cine film frame counters in general and more particularly to such a frame counter for a cinematographic projector having a high speed pulldown and capable of high speed forward and rewind motion.

As used herein, "projector pulldown time" is the interval between successive frames, i.e., the time required for displacing one frame from the film gate and moving the next succeeding frame into the gate. Otherwise stated, it is the interval of time the film is in motion between two consecutive frames.

In certain types of projection systems such as those used in some simulator visual systems, fast pulldown (i.e., short pulldown time) and the ability to move from one section of the film to another at high speed is required. The fast pulldown is needed in particular where the projector is imaging on a television camera in which case pulldown must be synchronized with the television scan. fast forward and rewind indexing is needed to reduce simulator training time lost in performing these operations.

In simulator visual systems using cine film as the image source it is often desired to transform the project image to simulate a change in perspective point. To this end, information relating to the position and attitude of the camera which took the picture being projected is needed. This information is recorded as the film is made and used in a flight simulation computer along with data relating to the simulated aircraft to provide signals to control the visual system so as to effect apparent viewpoint displacement. Such a visual system is shown in U. S. Pat. Nos. 2,975,670, 2,999,322, 3,233,508 and others granted to H. S. Hemstreet. In conventional projectors this information may be recorded on the film and read off during pulldown. With a high speed pulldown, however, it is not possible to read information from the film during pulldown. Consequently, the information must be stored in the flight computer indexed by frame number. For it to be usable, an accurate frame count is needed at all times. Prior art frame counting systems have generally been susceptible to noise and interference occasionally causing generation of false pulses. Although such systems are adequate in most cases, they are not good enough for use where an absolutely accurate frame count is needed.

The present invention seeks to overcome the foregoing problems by inhibiting the count during periods when noise and interference is likely to occur and by providing motion detection means to permit a change in count direction only when the drive has come to a complete stop.

The principle object of this invention is to provide a film frame counter which is not susceptible to noise interference.

Another object is to provide such a counter which will reverse direction only when film motion has actually reversed.

A further object is to provide such a counter which is compatible with a digital computer.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understand of the nature and objects of the invention reference should be had to the following detailed description taken in connection with the accompanying drawing, in which the single FIGURE is a block-schematic diagram of the preferred embodiment of the film frame counter.

The invention is shown and will be described in conjunction with a conventional web transporting system of the type utilizing a torque, servo, or stepper motor to intermittently advance the web in precisely controlled increments. Where the web is perforated cine film, the motor drives a sprocket but for tape or unperforated film, the motor drives a capstan, friction rollers or the like. Such transport systems also include a tachometer and encoder means for precise control of the web stopping positions (i.e., the "framing" in the case of cine film). For additional information on such film and tape transports reference may be had to U.S. Pat. Nos. 3,248,029; 3,532,295; 3,565,521; and 3,581,964.

Referring now to the drawing, a conventional film transport system of the type described above, sold commercially as the Wollensak Model No. M-101, is shown schematically as comprising a torque motor 11 which drives a film sprocket (not shown) and is rotatively coupled to an encoder 13 and a tachometer 73. Energization of motor 11 is effected by means of conventional control electronics 15 receiving a feedback signal from encoder 13 and a film advance command signal on line 17. In the exemplary embodiment being described, encoder 13 generates a high level or logical 1 output signal when the film is properly framed within desired tolerance and a low level (logical 0) output at all other times. Thus, for each advance command provided on line 17, motor 11 rotates a fixed amount to cause a single frame advance. For example, if motor 11 rotates 90° per frame advance then four outputs, spaced 90° apart, each of one bit resolution, will be provided for each rotation of encoder 13. The output signal on line 19 is provided to a comparator 21 of conventional design, having as a second input a threshold signal the level of which is adjustable by setting a potentiometer 23. Suitable resistors 25 are provided in the input and feedback path of comparator 21 in a manner well known in the art. Comparator 21 provides an output signal when the input signal on line 19 drops below the threshold setting. By having a relatively high threshold setting, low level noise does not trigger comparator 21. The output signal from comparator 21 is inverted through an inverter and level shifter 27 providing an inverted output on line 29. This output is again inverted by an inverter 31 having an output on line 33. Inverters 27 and 31 may be simply grounded emitter transistor inverters. Level shifting in inverter 27 is required, for example, where the output of comparator 21 is 15 volts and a 5 volt logic level is used.

The signal on line 29 is used to trigger a one shot multivibrator 35 and that on line 33 a one shot 37. The outputs of one shots 35 and 37 are Anded in And gate 39. As previously mentioned, the output of encoder 13 is high when the film is framed and goes low when advanced as shown by waveform 41. The duration of this pulse, 7m sec in the disclosed embodiment, is approximately equal to, but in any case less than, the projector pulldown time as hereinbefore defined and at the output of comparator 21 is a positive-going pulse 43 of equal duration. Pulse 43 appears as pulse 45 after inversion and triggers one shot 35 on its leading edge (going from a positive voltage to zero). One shot 35 is set to provide a pulse 47 of about 1 to 2 m sec which is taken from its inverted output. This in effect disables gate 39 for that period, i. e., the output normally is high and goes low only when the one shot is triggered.

Pulse 49 through inverter 31 triggers one shot 37 on its trailing edge. By this time pulse 47 will have returned to a high level enabling gate 39 so that output pulse 50 from one shot 37 is passed and appears as a count pulse 51 at the gate output. The disabling effect of pulse 47 serves to mask any noise or oscillation occurring during the beginning of pulldown, i.e., waveform 41 may not have a clean leading edge but may go between high and low a number of times before settling thus causing false counts if allowed to pass through. Pulse 51 is provided to a reversible or "up-down" counter 71 in a manner to be described below. Such counters are wellknown in the art as shown, for example, by U.S. Pat. No. 3,132,262. A typical commercially-available counter suitable for the purpose is the Texas Instruments Synchronous Up-down Counter Ser. No. 74193.

The pulses described above occur in the same manner whether the film is being displaced forwardly or in reverse. Accordingly, means must be provided to indicate the direction of travel. A forward-reverse switch 53 is provided both to enable the input to counter 71 and to command the desired film direction on line 54. The output of switch 53 is provided directly to gate 55 and through an inverter 57 to gate 59. Thus, if the switch is in the forward position a positive voltage enables gate 55 and if in reverse a zero voltage becomes a positive voltage through inverter 57 to enable gate 59. The second input to each of gates 55 and 59 is from a motion detector 61 to be described presently. A positive output from detector 61 (on line 93) is present only when the film is stationary. This is neccessary since the film may be run in a flow mode at high speed in which case, because of inertia of the system, it will not change direction immediately on command from switch 53 but coasts through a large number of frames before stopping. Therefore, to obtain an accurate count it is essential that the film be stopped before the direction of count is changed.

The outputs of gates 55 and 59 are provided to the set and reset inputs of a set-reset flip flop 63 the function of which is to indicate the true direction of motion. For example, assuming the film is stationary and switch 53 is placed in forward, a voltage from gate 55 will set flip flop 63. Should the film be caused to move forward at high speed, flip flop 63 remains set indicating forward motion. If switch 53 is moved to reverse, gate 59 is enabled but, until film motion ceases so that a second input is provided from detector 61, gate 59 can not reset flip flop 63. When the film stops prior to reversing both inputs to gate 59 are present and flip flop 63 is reset indicating reverse motion.

The output of flip flop 63 is provided directly to an And gate 65 and, through inverter 67, to an And gate 69. And gate 65 is enabled when flip flop 63 is set and And gate 69 is enabled when flip flop 63 is reset. The second input to gates 65 and 69 is the count pulse 51. During forward film motion, count pulses pass through gate 65 and, during reverse travel, the pulses pass through gate 69. The outputs of gates 65 and 69 are provided to the up and down inputs respectively of binary counter 71 which then continuously reflects an accurate frame count.

Motion detector 61 may take any convenient form. In the preferred embodiment shown, tachometer 73 provides an input to an amplifier 75 having appropriate input and feedback resistors 76 to provide a gain of about 2. The input is clamped by diodes 77 so that it never exceeds plus or minus one diode drop. If the film is moving in either direction a tach output signal is present and consequently an output signal from amplifier 75. Depending on direction of motion the amplifier output signal will be positive or negative. When stationary, both the tach output signal and the output signal of amplifier 75 are zero. The output signal of amplifier 75 is provided as an input to the bases of transistors 79 and 81 both having grounded emitters. Transistor 79 has its collector connected through resistor 83 to a positive voltage source and transistor 81 has its collector connected through resistor 85 to a negative voltage source. The output of transistor 81 is coupled to the base of transistors 87 which is biased by resistor 85, 89 and 91.

A positive voltage from amplifier 75 turns on transistor 79 causing its collector and, concomitantly, the circuit output on line 93 to go to ground. A negative voltage turns on transistor 81 and, in turn, transistor 87 dropping its collector and, with it, the output on line 93 to ground potential. In contrast with a zero input from amplifier 75 all transistors are non-conductive and the positive voltage through resistor 83 is present on output line 93 to enable gates 55 and 59.

As mentioned above the frame count must be provided to a computer (106) which stores information relating to the frames being displayed. Computer 106 may be any type of digital electronic computer capable of filling the role of a flight simulation computer, i.e., having the capacity to meet the high speed computational requirements for real time simulation. Many commercially available general purpose machines, e.g., the XDS Sigma 5 and Sigma 7, have the requisite capabilities. In addition there are machines which, albeit essentially of the general purpose type, are designed specifically to meet the particular demand of flight simulation applications. An example of this "special general purpose" computer is that disclosed in U.S. Pat. No. 3,363,331 to J. M. Hunt. Computers of this type are commercially available from The Singer Company, Simulation Products Division, Binghamton, New York under the model designation GP-4B.

To avoid loading information into computer 106 when a count is changing the control network indicated within dotted lines 95, is provided.

Count pulses 51 are provided to a one shot 97 which produces a short delay to allow the count to be updated and then triggers a one shot 99 which supplies a pulse to set a flip flop 101 resulting in an output signal on line 103 enabling And gate 105. A predetermined time before computer 106 is ready to load new information it provides a sync pulse output on line 107. This passes through gate 105 if enabled and then through an OR gate 109 on line 110 to a register 111 which is connected to the count output lines of counter 71. Register 111 is conventional; a suitable, commercially available register is the Texas Instruments 7474 I.C. storage register.

The pulse on line 110 causes the count to be transferred to register 111 which has its outputs 113 connected to computer 106. The computer may then obtain the correct frame count from lines 113. The output of gate 105 is also connected to a one shot 115 which has its output connected to the reset input of flip flop 101. On the trailing edge of the pulse from gate 105, one shot 115 provides a pulse to reset flip flop 101 in preparation for the next count.

A clear command from computer 106 to counter 71 may be provided on line 117 for use in zeroing the counter on start-up. This command is also provided to one shots 119 and 121 which, in manner similar to one shots 97 and 99, provide a delay and pulse which passes through Or gate 109 to line 110 in order to transfer the cleared condition to register 111.

Manual controls may also be provided to perform the clear and transfer functions by providing switches the outputs of which may be Ored with the computer commands in a manner well known in the art. Means may also be provided to preset counter 71 where it is not desired to start up with a zero frame count. Such means are also well known and will not be described herein.

Thus a film frame counter which has immunity from noise and interference, means to avoid inaccurate counts when the film direction is changed and means to interface it with a digital computer has been shown.

Although a specific embodiment has been shown it will be obvious to those skilled in the art that various modifications may be made without departing from the spirit of the invention which is intended to be solely limited by the appended claims.

What is claimed is:

1. In a pulsed pulldown motion picture projector having a known pulldown time, a film frame counter comprising in combination:

a. first means to generate a voltage at a first level when the film is properly framed and at a second level when not;
b. second means responsive to said first means to provide as an output a first pulse of a length substantially equal to but less than the projector pull down time upon transition of said voltage from said first to said second level;
c. third means responsive to said first means to provide as an output a second pulse upon transition of said voltage from said second to said first level;
d. gating means having the outputs of said second and third means as inputs, said first pulse providing a disabling input to said gating means whereby said second pulse will be provided as an output only when said first pulse is not present; and
e. a binary counter having the output of said gate as an input.

2. The invention according to claim 1 wherein said first means is a shaft encoder, said second means a first one shot multivibrator having the output of said shaft encoder as an input, said third means is an inverter and a second one shot multivibrator, said inverter having said encoder output as an input and providing its output to said second oneshot, and said gating means is an And gate having the $\bar{Q}$ output of said first one shot and the Q output of said second one shot as inputs.

3. The invention according to claim 1 wherein said film motion is bidirectional, said counter is an up-down counter and further including means to determine the direction of film motion and means to gate said count pulse to the proper one of the up and down count inputs of said counter.

4. The invention according to claim 3 wherein said means to determine comprises:

a. means indicating the commanded direction of film motion providing a first output for forward and a second output for reverse;
b. means to detect when said film is not moving; and
c. means responsive to said means to detect and said indicating means to store said forward and reverse indications and to change the stored indication only when said film is not moving.

5. The invention according to claim 4 wherein said means to indicate comprise:

a. single pole single throw switch having a voltage on its one terminal; and
b. an inverter having its input connected to the other terminal of said switch whereby a voltage will be provided from said other terminal when said switch is closed and from said inverter when said switch is open.

6. The invention according to claim 5 wherein said means to store comprise:

a. a first And gate having as one input the output of said other terminal and as another input the output of said detector;
b. a second And gating having as one input the output of said inverter and as another input the output of said detector; and
c. a set-reset flip flop having the output of said first gate as a set input and the output of said second gate as a reset input.

7. The invention according to claim 4 wherein said means to detect comprises:

a. a tachometer coupled to the film drive; and
b. circuit means having said tachometer output as an input to provide an output when the voltage from said tachometer is substantially zero.

8. The invention according to claim 1 and further including means to transfer the count in said counter to a digital computer.

9. The invention according to claim 8 wherein said means to transfer comprises:

a. a storage register having inputs from said counter and outputs connected to said computer;
b. means to transfer the count from said counter to said register; and
c. means operable to initiate said transfer only when said count is not changing.

10. The invention according to claim 9 wherein said computer provides an output pulse a predetermined time before data is to be read by said computer and wherein said means to transfer comprise gating associated with said register having the outputs of said counter as first inputs and an output from said means to initiate as second inputs, said means to initiate comprising:

a. a first one shot multivibrator having said count pulse as an input;
b. a second multivibrator having the output of said first multivibrator as an input;
c. a set-reset flip flop having the output of said second multivibrator as a set input;
d. an And gate having the output of said flip flop as one input and the pulse from said computer as a second input, the output of said gate providing said enabling input to said register gating; and e. a third one shot multivibrator having the output of said gate as an input and having its output connected to the reset input of said flip flop.

11. The invention according to claim 10 wherein said computer has an output by which a clear pulse may be provided to said counter and further including:

a. an Or gate between said And gate and said register gating; and b. delay means having said clear pulse as an input and providing, after a delay, a second input to said Or gate, whereby after a delay sufficient to clear said counter, said cleared count will be transferred to said register.

* * * * *

UNITED STATES PATENT OFFICE

CERTIFICATE OF CORRECTION

Patent No. 3,774,160 Dated November 20, 1973

Inventor(s) Philip G. Barboni

It is certified that error appears in the above-identified patent and that said Letters Patent are hereby corrected as shown below:

Column 1, line 24, change "fast" to --Fast--.

Column 1, line 28, change "project" to --projected--.

Column 2, line 6, change "understand" to --understanding--.

Column 4, line 55, change "a" to --the--.

Signed and sealed this 6th day of August 1974.

(SEAL)
Attest:

McCOY M. GIBSON, JR.
Attesting Officer

C. MARSHALL DANN
Commissioner of Patents